United States Patent Office 3,560,519
Patented Feb. 2, 1971

3,560,519
AROMATIC MONO(NITRILE CARBONATES)
Emmett H. Burk, Jr., Glenwood, Ill., and Donald D. Carlos, Crown Point, Ind., assignors to Sinclair Research Inc., New York, N.Y.
No Drawing. Continuation of application Ser. No. 671,932, Oct. 2, 1967, which is a continuation-in-part of application Ser. No. 502,620, Oct. 22, 1965. This application Mar. 28, 1969, Ser. No. 816,150
Int. Cl. C07d 85/06
U.S. Cl. 260—307                                3 Claims

ABSTRACT OF THE DISCLOSURE

Compounds of the formula

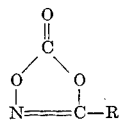

wherein R is an aromatic hydrocarbon radical of 1 to 3 aromatic rings which can be substituted with, for instance, halogen, nitro, or alkoxy, e.g., methoxy, groups except that when R is monocyclic, R is substituted on the ring with at least one of the aforementioned groups. The compounds can be made by reacting the corresponding hydroxamic acids and phosgene.

---

This application is a continuation of abandoned application Ser. No. 671,932, filed Oct. 2, 1967, which latter application is in turn a continuation-in-part of abandoned application Ser. No. 502,620, filed Oct. 22, 1965.

The present invention is directed to a new class of organic compounds. More specifically, the invention is directed to aromatic mono(nitrile carbonates) which can be represented by the following structure:

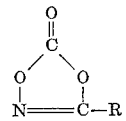

wherein R in the above structure is an aromatic hydrocarbon radical of 1 to 3 aromatic rings often containing a total of 6 to about 30 carbon atoms or more, preferably 6 to 12 carbon atoms, except that when the aromatic hydrocarbon R is monocyclic it contains as a substituent on the ring, for instance, one or more halogen, e.g., chloro, bromo or fluoro, nitro, or alkoxy groups, which alkoxy groups contain about 1 to 20, preferably about 1 to 10, carbon atoms. The aromatic hydrocarbon radical can be similarly substituted when the radical R contains more than one ring or the radical R of 1 to 3 aromatic rings can contain other members such as alkyl, for instance, of about 1 to 20, preferably about 1 to 10, carbon atoms. The nitrile carbonate group is attached to one of the aromatic rings of aromatic hydrocarbon R. Thus, the novel compounds of the invention include the mono(nitrile carbonates) of, for instance, naphthalene, anthracene, phenylbenzene, phenylnaphthalene, diphenylalkylenes such as diphenylmethylene, diphenylethylene (stilbene), etc., dinaphthylalkylene and like aromatic hydrocarbons. Since the compounds of the invention can be decomposed to monoisocyanates (RNCO), the R group in the above structure contains no hydrogen reactive with isocyanate.

The aromatic mono(nitrile carbonates) of the present invention are valuable intermediates or precursors for the preparation of highly desired chemicals. For example, as mentioned above, the mono(nitrile carbonates) can be thermally decomposed to monoisocyanates. Monoisocyanates can be used in the preparation of urethanes, ureido compounds, and other derivatives of various active hydrogen compounds. The aromatic mono(nitrile carbonates) can also be acid hydrolyzed to aromatic hydroxamic acids.

Decomposition of the aromatic mono(nitrile carbonate) to the corresponding aromatic isocyanates can be effected by simply heating the aromatic mono(nitrile carbonates) to a temperature below the degradation point of the desired aromatic isocyanate product. Since the decomposition reaction is exothermic there is a tendency of the reaction temperature to run away. Means for carrying away or absorbing heat should be used, therefore, to control the temperature below the degradation point of the desired aromatic isocyanate product. The temperature employed will vary, of course, depending upon the decomposition temperature of the feed and degradation temperature of the particular aromatic isocyanates being prepared. In most cases, however, the temperature will usually fall in the range of about 50 to 200° C., preferably about 75 to 150° C. Advantageously, the decomposition is conducted in the presence of an inert solvent such as benzene, xylene, toluene, chlorobenzene and the like or in phosgene.

The ability of the aromatic mono(nitrile carbonates) of the invention to generate isocyanates upon heating provides an additional advantage in that the aromatic mono (nitrile carbonates) of the invention, in contrast to isocyanates, are stable in the absence of water and therefore can be easily handled and stored. Also, since there is no active hydrogen (e.g. in the form of HCl) present in the aromatic mono(nitrile carbonates) of the invention or in the decomposition products formed, to react with the isocyanate when the latter is made, use of the aromatic mono(nitrile carbonates) for the production of isocyanates provides a method that does not suffer from the reduced yields and separation and purification problems presented by the by-products obtained from starting materials of commercial methods wherein active hydrogen is present. Use of the aromatic mono(nitrile carbonates) in the preparation of isocyanates, furthermore, provides a process having advantages over commercial methods employing azides in that the former do not have the explosion tendencies of the latter and are more economical.

The aromatic mono(nitrile carbonates) of the invention can be prepared by reacting an aromatic monohydroxamic acid and phosgene. Aromatic monohydroxamic acids which react with phosgene to produce the novel compounds of the invention can be represented by the structure:

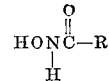

wherein R is as defined above in the structure of the aromatic mono(nitrile carbonates) of the invention. Thus, the aromatic hydroxamic acid reactants include, for instance, naphthomonohydroxamic acids, anthromonohydroxamic acids, phenylbenzomonohydroxamic acids, phenylnaphthomonohydroxamic acids, diphenylalkylenemonohydroxamic acids and dinaphthylalkylenemonohydroxamic acids.

Illustrative or aromatic monohydroxamic acids suitable for use as the reactant in the preparation of the aromatic mono(nitrile carbonates) of the invention are the following: monocyclic-aromatic monohydroxamic acids, e.g. 1-chloro-4-benzohydroxamic acid, 1-bromo-4-benzohydroxamic acid, 1-fluoro-4-benzohydroxamic acid, 3-nitro-benzohydroxamic acid, methoxybenzohydroxamic acid, ethoxybenzohydroxamic acid, pentoxybenzohydroxamic acid, eicosoxybenzohydroxamic acid, etc.; polycyclic-aromatic monohydroxamic acids, e.g., naphthomonohydroxamic acids, such as alpha-naphthohydroxamic acid, cyclohexylbenzohydroxamic acid, tetrahydronaphthohydroxamic acid, 2-chloro-8-naphthohydroxamic acid, anthracene monohydroxamic acids, biphenyl monohydroxamic acids, such as 1-phenyl-4-benzohydroxamic acid, 1-benzyl-4-benzohydroxamic acid, 1-phenylethyl-4-benzohydroxamic acids and the like.

Illustrative examples of aromatic mono(nitrile carbonates) of the invention include those corresponding to the foregoing hydroxamic acids such as naphthomono(nitrile carbonates), such as alpha-naphthonitrile carbonate, 1-cyclohexyl-4-naphthonitrile carbonate, tetrahydronaphthonitrile carbonate, 1-chloro-4-benzonitrile carbonate, 4-bromo-1-benzonitrile carbonate, 3 - nitrobenzonitrile carbonate, anthracene mono(nitrile carbonate), biphenyl mono(nitrile carbonates) such as, 1-phenyl-4-benzonitrile carbonate, 1-benzyl-4-benzonitrile carbonate, 1-phenylethyl-4-benzonitrile carbonate and the like.

The temperature for effecting the reaction of the aromatic hydroxamic acid and phosgene may vary depending upon the particular aromatic hydroxamic acid selected but in all cases should be conducted below the decomposition temperature of the desired aromatic nitrile carbonate. Reflux temperatures can also be used as long as the reflux temperature of the particular mixture is below the decomposition temperature of the corresponding aromatic nitrile carbonate produced. The reaction temperature will often fall in the range of up to about 90° C., preferably up to about 50° C. The reaction has been successfully run at temperatures as low as about minus 30° C. Ordinarily the reaction will proceed readily at atmospheric pressure but sub- and superatmospheric pressure can be employed if desired.

Either the monohydroxamic acid reactant or the phosgene reactant can be in excess but it is preferred that at least a stoichiometric amount of phosgene be used, that is, a ratio of at least one mole of phosgene per hydroxamic acid substituent. A large excess of phosgene is particularly preferred.

The reaction can be conducted in the liquid phase and in many cases the aromatic monohydroxamic acid will react from the solid state. Advantageously, the aromatic monohydroxamic acid is first dissolved or slurried in an oxygen-containing organic solvent. Illustrative of suitable oxygen-containing solvents are the phosgene reactant itself and normally liquid organic ethers, esters, furans, dioxanes and the like. The preferred solvent is the phosgene reactant, an excess of which in most cases, will readily dissolve the aromatic monohydroxamic acid.

The reaction is often over less than about 0.5 hour, for example, 15 minutes or in about 5 to 20 hours, depending upon the reaction temperature employed and is marked by a cessation in hydrogen chloride gas evolution. Normally at least about 0.5 hour is required for the reaction to go to completion at temperatures which minimize side reactions. The reaction is usually quite rapid once the aromatic monohydroxamic acid is dissolved. At the lower reaction temperatures the aromatic monohydroxamic acid is generally slow to dissolve and may even come out of solution, go back into solution, etc. during the reaction.

The aromatic nitrile carbonate can be recovered from the resulting solution by any desirable means, for instance, by first filtering the resulting solution to remove any unreacted starting materials and subecting the filtrate to reduced pressure to remove unreacted phosgene and inert solvent, if employed, and provide the aromatic nitrile carbonate as a crude product. Alternately, prior to the filtering step, the solution can be cooled to crystallize out the product and recovered as described. The crude product which can be either crystalline or liquid depending on the particular aromatic mono(nitrile carbonate) prepared, contains small amounts of impurities high in chlorine content. A purer product can be obtained by recrystallization techniques as, for instance, from a suitable solvent such as dichloromethane, carbon disulfide, ethyl acetate, phosgene and the like, or mixtures thereof.

A convenient alternative method for obtaining an essentially chlorine-free aromatic mono(nitrile carbonate) is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular aromatic mono(nitrile carbonate) feed selected. If desired, a combination of both the recrystallization and extraction methods can be used to obtain essentially chlorine-free aromatic mono(nitrile carbonate). Thermal decomposition of the essentially chlorine-free feed results in improved yields of a purer isocyanate product, which is also essentially chlorine-free.

The following examples will serve to illustrate the present invention but are not to be construed as limiting.

EXAMPLE I

To a 500 cc. round bottom flask equipped with a reflux condenser attached to a $CaCl_2$ drying tube, is added 24.6 g. (0.131 mole) of alpha-naphthohydroxamic acid and 200 cc. of ether. The mixture is stirred mechanically at room temperature for about three hours during which time 49.5 g. (0.500 mole) of phosgene is introduced. The resulting solution is filtered and the solvents removed under reduced pressure. There is obtained a white solid, alpha-naphthonitrile carbonate.

EXAMPLE II

Similarly, 29.6 g. (0.124 mole) of 9-anthrohydroxamic acid is treated with 49.5 g. (0.500 mole) of phosgene to give 9-anthronitrile carbonate.

EXAMPLE III

To a 300 cc. fluted, round bottom flask equipped with a reflux condenser attached to a $CaCl_2$ drying tube, is added 50 g. (0.30 mole) of p-methoxybenzohydroxamic acid and 100 cc. anhydrous ether. To the rapidly stirred slurry is added 372 g. (3.76 moles) of phosgene dropwise. The reaction mixture is heated to 34° C. for one hour. The resulting solution is filtered and the solvents removed under reduced pressure. There results a quantitative yield of crude, oily p-methoxybenzonitrile carbonate which upon trituration with an ether-pentane mixture gave a chlorine-free solid.

EXAMPLE IV

In a similar manner, 50.0 g. (0.274 mole) of p-nitrobenzohydroxamic acid is treated with 330 g. (3.33 moles) of phosgene for four hours at a maximum temperature of 35° C. There is obtained a quantitative yield of crude p-nitrobenzonitrile carbonate which upon trituration with pentane gives a chlorine-free white solid.

EXAMPLES V–VI

In like fashion, 49.7 g. (0.273 mole) of m-nitrobenzohydroxamic were treated with 330 g. (3.33 moles) of phosgene for an hour and a quarter at a maximum temperature of 44° C. There is obtained a quantitative yield of crude m-nitrobenzonitrile carbonate which upon trituration with pentane gives a chlorine-free solid. Similarly, m-bromobenzonitrile carbonate can be prepared from 21.6 g. (0.100 mole) of m-bromobenzohydroxamic acid and 330 g. (3.33 moles) of phosgene.

It is claimed:
1. A compound having the structure:

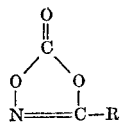

wherein R is selected from the group consisting of:
(a) anthracyl and
(b) anthracyl which contains as a ring substituent a member selected from the group consisting of halo, nitro, alkyl of 1 to 10 carbon atoms, and alkoxy of 1 to 10 carbon atoms.

2. The compounds of claim 1 wherein R is anthracyl.
3. 9-anthronitrile carbonate.

References Cited
UNITED STATES PATENTS
3,182,068   5/1965   Sasse et al. _____ 260—306.7

OTHER REFERENCES
Beck, Berichte, 84, 688–9 (1951).

ALEX MAZEL, Primary Examiner
R. J. GALLAGHER, Assistant Examiner

U.S. Cl. X.R.
260—240, 454, 500.5